(12) United States Patent
Elliott et al.

(10) Patent No.: US 9,639,875 B1
(45) Date of Patent: May 2, 2017

(54) RECONFIGURING RESERVED INSTANCE MARKETPLACE OFFERINGS FOR REQUESTED RESERVED INSTANCE CONFIGURATIONS

(71) Applicant: Amazon Technologies, Inc., Reno, NV (US)

(72) Inventors: Stephen Alden Elliott, Seattle, WA (US); David John Ward, Jr., Seattle, WA (US); Fran McClellan Shigley, III, Redmond, VA (US); Mohammed Samir Alabsi, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 79 days.

(21) Appl. No.: 14/109,445

(22) Filed: Dec. 17, 2013

(51) Int. Cl.
*G06Q 30/00* (2012.01)
*G06Q 30/06* (2012.01)

(52) U.S. Cl.
CPC ..... *G06Q 30/0611* (2013.01); *G06Q 30/0601* (2013.01); *G06Q 30/0621* (2013.01)

(58) Field of Classification Search
CPC ........................... G06Q 30/06; G06Q 30/0611
USPC ................................................. 705/26.1, 26.3
See application file for complete search history.

(56) References Cited

U.S. PATENT DOCUMENTS

| 7,637,426 B1 * | 12/2009 | Green ............................ 235/383 |
| 8,060,883 B1 * | 11/2011 | Rao et al. ...................... 718/104 |
| 8,676,622 B1 | 3/2014 | Ward, Jr. et al. |
| 8,769,531 B2 | 7/2014 | Anderson et al. |
| 8,924,539 B2 * | 12/2014 | Ferris et al. ................... 709/224 |
| 2005/0228855 A1 * | 10/2005 | Kawato .......................... 709/200 |
| 2010/0191881 A1 * | 7/2010 | Tauter et al. ................. 710/104 |

(Continued)

FOREIGN PATENT DOCUMENTS

WO       WO 0117182 A1 *  3/2001

OTHER PUBLICATIONS

Rupnow, Kyle J., Resource Management for Reconfigurable Computing Systems, 2010, UMI Dissertation Publishing.*

(Continued)

*Primary Examiner* — Brandy A Zukanovich
*Assistant Examiner* — Brittney N Miller
(74) *Attorney, Agent, or Firm* — Robert C. Kowert; Meyertons, Hood, Kivlin, Kowert & Goetzel, P.C.

(57) ABSTRACT

A virtual computing resource provider may implement reconfiguration of reserved compute instance marketplace offerings for requested reserved compute instance configurations. A request for listings of reserved compute instances available for resale according to a specified instance configuration may be received. Reserved compute instances may be identified that are reconfigurable to satisfy the specified configuration (e.g., a particular type, location, or reservation term length). Listing may be provided for reservation by a client that include modified listings that describe a configuration for the reconfigurable reserved compute instances that satisfies the specified configuration. In some embodiments, a reservation request for a modified listing may be received, and in response the reserved compute instance associated with the modified listing may be reconfigured (e.g., modified, upgraded, downgraded, or term adjusted) as described in the modified listing. Access to the reconfigured reserved compute instance may then be provided to the reserving client.

18 Claims, 12 Drawing Sheets

(56) References Cited

U.S. PATENT DOCUMENTS

2010/0318454 A1* 12/2010 Warncke et al. ............... 705/37
2011/0016214 A1*  1/2011 Jackson ....................... 709/226
2012/0290460 A1* 11/2012 Curry et al. .................... 705/37
2012/0311111 A1  12/2012 Frew et al.
2014/0047437 A1   2/2014 Wu et al.
2014/0279353 A1*  9/2014 Findlan et al. ................ 705/37

OTHER PUBLICATIONS

AWS Documentation, "Selling in the Reserved Instance Marketplace", Jun. 15, 2014, 1 page.

* cited by examiner

RECONFIGURING RESERVED INSTANCE MARKETPLACE OFFERINGS FOR REQUESTED RESERVED INSTANCE CONFIGURATIONS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may have to try to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. In business environments where clients may choose from among multiple providers for network-based computing options, provider network operators may wish to maintain high levels of customer satisfaction and customer retention, e.g., by making resource acquisition easy and economical, and by reducing the complexity of client resource budget management as much as possible. For example, some provider network operations may offer customers the ability to resell reserved compute instances in a resale marketplace so that customers may adjust their acquired resources if they are less than previously forecasted.

Figure 1:
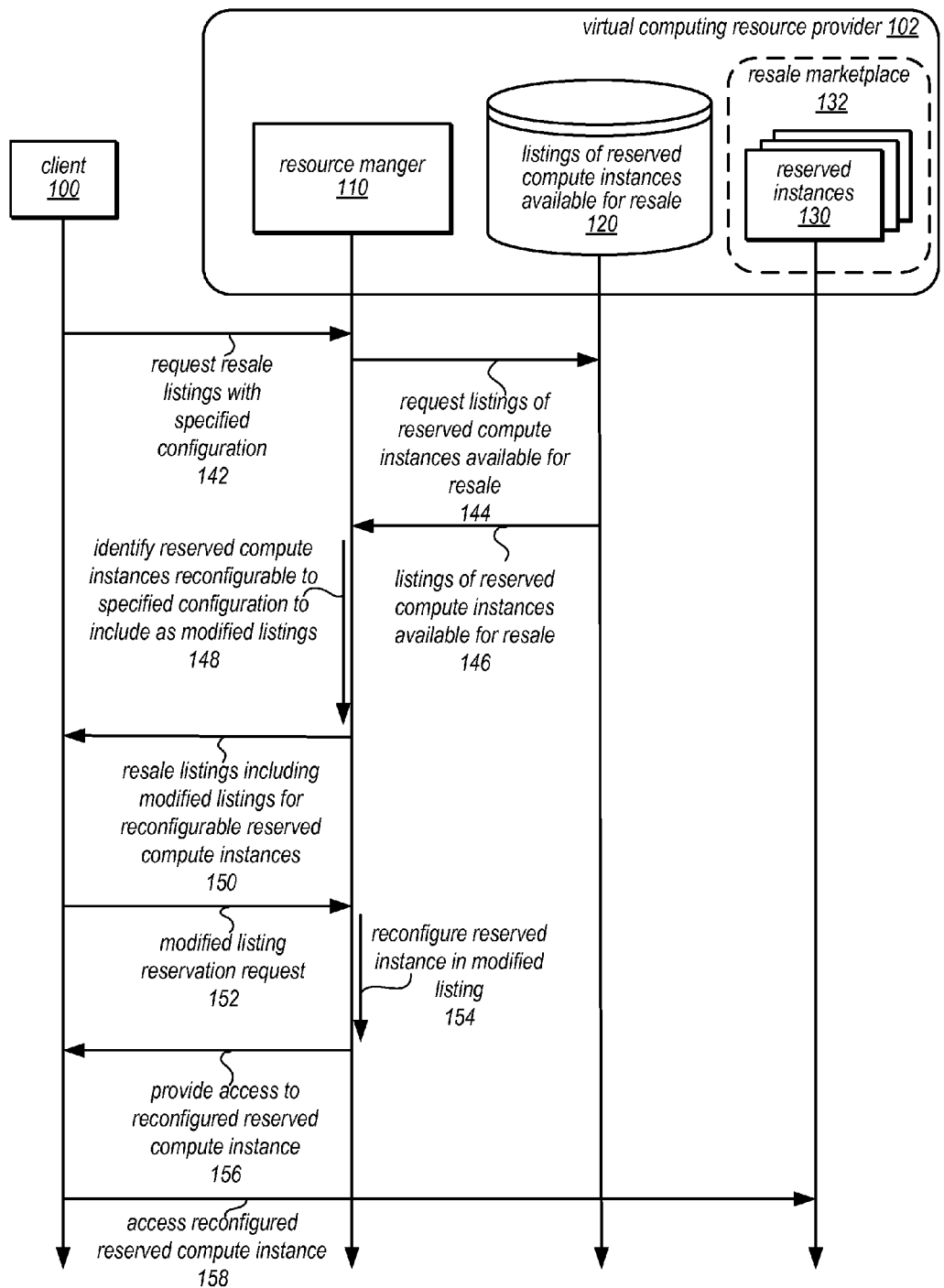
FIG. 1 is a diagram illustrating a virtual computing resource provider that provides reconfigurable reserved compute instance marketplace offerings to clients requesting a specified instance configuration, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement reconfiguring reserved compute instance marketplace offerings for requested reserved compute instance configurations, according to some embodiments. Virtual computing resource providers may provide computing resources to clients, users, or other type of customers, in the form of reserved compute instances (e.g., a virtual machine acting as a distinct logical computing system that provides users with the illusion that they are the sole operators and administrators of a given hardware computing resource). Clients may reserve (i.e., purchase or buy) a reserved compute instance for a specified length of time. Reserved compute instances may be configured in many different ways, such as based on performance characteristics (e.g., utilization, size, capacity, etc.) or the length of time desired. In some embodiments, a reserved compute instance, may always be available to a client, and thus reserved for the client's use. Thus, clients may be able to procure computing resources according to their determined needs.

Clients who utilize virtual computing resources may take advantage of the flexibility with which new resources can be acquired. Resources can be quickly scaled to meet demand, such as for a client implementing a fast-growing web service. For example, in some embodiments reserved compute instances may be purchased for a period of time (term length) to operate the web service, with additional reserved compute instances purchased as needed (e.g. as demand increases). Client needs, however, may change. If, for example, demand for the web service drops sharply off, some reserved compute instances purchased to operate the web service may be underutilized, and may no longer be needed by a client. In various embodiments, a virtual computing resource provider may implement a resale marketplace (which may be in addition to an initial sale marketplace) for the client to resell unwanted reserved compute instances for which a term of use/ownership is still remaining. In this way, clients may recoup some investments in computing resources that would otherwise be lost if the resources remained underutilized.

A resale computer resource marketplace implemented by a virtual computing resource provider may, in various embodiments, maintain listings of reserved compute instances for resale by their respective current owners (resellers). Clients seeking to reserve/purchase additional computing resources may choose search, browse, or otherwise ascertain the reserved compute instances available for resale in the resale marketplace. These potential buyers, however, may have desired configurations of reserved compute instances which satisfy their own computing resource needs. If for example, a specified buyer desires a reserved compute instance with at least 7 months remaining in the term length, and the only reserved compute instances listed as available for resale are for term lengths of 5 months or less, then the potential buyer may procure the reserved instance from an initial sale marketplace (which may offer standardized term lengths e.g., 1 month, 6 months, 1 year, etc. . . . ) which at least may satisfy the desired configuration. For resellers, especially those with uncommon or less desirable configurations of reserved compute instances, the opportunities for recouping resource expenditures may not be very numerous.

In various embodiments, virtual computing resource providers may implement various techniques to introduce more flexibility into resale transactions for reserved compute instances. For instance, reserved compute instances may be reconfigured to meet standardized configurations similar to the offerings of an initial sale marketplace in some embodiments, which may allow resellers to compete for buyers who would have resorted to purchasing a standardized reserved compute instance from the initial sale marketplace. Reseller flexibility may also be introduced by allowing reconfigurations more tailored to meet potential buyers wants or needs. FIG. 1 is a diagram illustrating a virtual computing resource provider that provides reconfigurable reserved compute instance marketplace offerings to clients requesting a specified instance configuration, according to some embodiments.

A virtual computing resource provider 102 may offer a variety of computing resources clients, customers, or users, in some embodiments. Such resources may include different types of compute instances, such as reserved compute instances 130. Reserved compute instances 130 may be initially reserved, purchased, or otherwise acquired for length of time from virtual computing resource provider 102 to perform various client operations. Some clients, however, may wish to resell reserved compute instances for various reasons. Thus reserved compute instances 130 may be listed for sale in resale marketplace 132. A client 100 may be any type of computing system or device (such as computing system 2000 described below with regard to FIG. 12) configured to communicate with virtual computing resource provider 102. Client 100 may, in various embodiments, facilitate interactions for a customer or buyer and resale marketplace 132.

Figure 12:
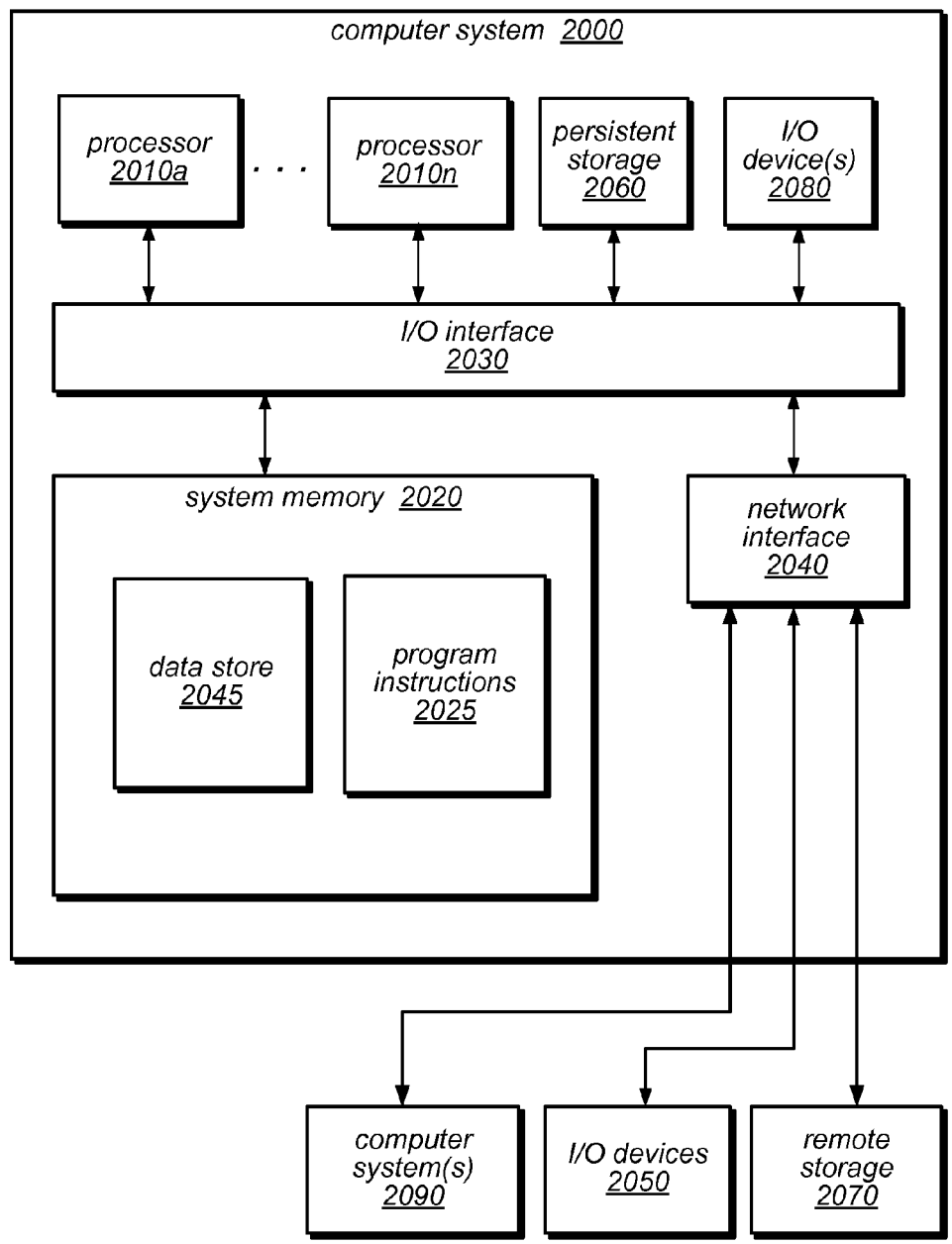
FIG. 12 is a block diagram illustrating an example computing system, according to some embodiments.

Virtual computing resource provider 102 may implement a resource manager 110, which may be one or more various servers or computing devices (such as computing system 2000 described below with regard to FIG. 12). Resource manager may perform various functions to handle both the reservation/purchase of reserved compute instances 130 as well as the management of reserved compute instances 130. In some embodiments, virtual computing resource provider may implement a management database 120 that maintain, among other information, listings of reserved compute instances available for resale.

As illustrated in FIG. 1, client 100 may send a request for resale listings of reserved compute instances with a specified instance configuration 142 to resource manager 110. The specified configuration may include a variety of different attributes, including, but not limited to, term length, size or performance capacity, type (e.g., specific purpose, such as optimized for graphics processing, memory, storage, etc. . . . , or a type of use, such as heavy, medium, or light utilization, type of software or other applications running on the reserved compute instance (e.g., a specific operating system), or a location (e.g., particular data center, availability zone, or geographic region). Resource manager 110 may obtain listings of reserved compute instances available for resale, such as by requesting listings of reserved compute instances available for resale 144 from management database 120 maintaining the listings.

Once listings have been obtained, such as receiving the listings 146 from management database 120, reserved compute instances 130 that are reconfigurable to satisfy the specified configuration may be identified 148 and modified listings created describing the reconfigurable reserved compute instances 130 that satisfy the specified configuration. For example, in various embodiments, the reserved computed instances available for resale may be evaluated to determine whether one or more different types of reconfiguration operations may be performed to change the configuration of the reserved compute instance 130 to satisfy the specified configuration. Modification operations may be one type of reconfiguration operation performed to reconfigure a reserved compute instance 130 that may not incur any additional cost to virtual computing resource provider 102 (e.g., moving a reserved compute instance from one availability zone to another). Upgrade operations may be one type of reconfiguration operation performed to reconfigure a reserved compute instance 130 that may incur additional cost to virtual computing resource provider 102 (e.g., upgrading to a higher utilization type of instance). Downgrade operations may be one type of reconfiguration operation performed to reconfigure a reserved compute instance 130 that may leave a residual resource value to virtual computing resource provider 102 (e.g., moving a reserved compute instance 130 to a cheaper data center). Various other reconfigurations, such as adjusting the term length (either to a standardized offering or a customized length) may also be performed. Reserved compute instances 130 may be partially reconfigured (e.g., a remainder of the term or a remainder of the computing resource is not needed to satisfy the specified configuration). Reserved compute instances may be combined with others (e.g., virtual machines implementing the reserved compute instance 130 may be expanded to include physical hardware implementing by another reserved compute instance into the same virtual machine) or broken apart into smaller reserved compute instances (e.g., a large reserved compute instance offering 4 virtual cpu cores may be broken apart into 4 small reserved compute instances each offering 1 virtual cpu core).

Modified listings describing a reserved compute instance 130 that satisfies the specified configuration information may be made for these identified reconfigurable reserved compute instances 130 and included in resale listings for reserved compute instances provided to client 100. A list price (which may be different than a reseller asking price initially provided by the reseller) may be determined for a modified listing based, at least in part, on various factors, such as costs to perform reconfiguration, a current value of the reserved compute instance 130 (or similar resources), or the seller's asking price, in various embodiments. In at least some embodiments, all of the provided listings may be modified listings. Authorization for reconfiguring the reserved compute instance 130 may also be obtained from resellers (such as for partial sales due to partial reconfigurations). In some embodiments, authorization may not be obtained (e.g., where partial sale is not necessary). From the perspective of client 100, modified listings may not appear any different (or be designated or identified in any way) from resale listings that are not reconfigurable reserved compute instances.

Client 100, in some embodiments, may send a reservation request 152 for a modified listing (e.g., in order to purchase/reserve it for use) to resource manager 110. Resource manager 110 may then perform reconfiguration operations to reconfigure the reserved compute instance in the modified listing 154 (or multiple reserved compute instances as in the case where reconfiguration involves combining). Please note that in various embodiments, reconfiguration of reserved compute instances may not be reconfiguration of the specific reserved compute instance (or instances) but may be one or more other reserved compute instances available. Reconfiguration may be a reconfiguration of a pricing agreement to use a reserved compute instance (or instances) of the specified configuration. Resource manager 110 may receive an indication that funds for the modified reservation equivalent to the list price have been received for virtual computing resource provider 102. Resource manager 110 may also transfer funds equivalent to the reseller asking price (or a prorated amount of the reseller asking price, such as if there was only a partial sale) to an account for the reseller. Resource manager 110 may provide access to the reconfigured reserved compute instance 156 to client 100, and client 100, or another client, system or device, may then access the reconfigured reserved compute instance 158.

Modified listings for reconfigurable reserved compute instances may serve as inputs to various other systems, modules, or devices for virtual computing resource provider 102. For example, in some embodiments, virtual computing resource provider 102 may provide client recommendations to purchase/reserve particular listings of reserved compute instances 130 (e.g., according to an optimization goal for the client like price or performance). Modified listings may also be provided for price alternatives, such as in a comparison graphical user interface generated for display by client 100 to a user, in some embodiments.

Please note that previous descriptions are not intended to be limiting, but are merely provided as an example of reconfigurable reserved compute instance marketplace offerings according to requested reserved compute instance configurations. Various other components may store listing information, generating modified listings, or communicate with a client. Other differences, for example, such as the number of clients or the number of available reserved compute instances may also be different than illustrated in FIG. 1.

This specification begins with a general description of a virtual computing resource provider, which may implement reconfiguring reserved compute instance marketplace offerings for requested reserve compute instance configurations. Then various examples of a virtual computing resource provider are discussed, including different components/modules, or arrangements of components/module that may be employed as part of implementing a virtual computing resource provider. A number of different methods and techniques to implement reconfiguring reserved compute instance marketplace offerings for requested reserve compute instance configurations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
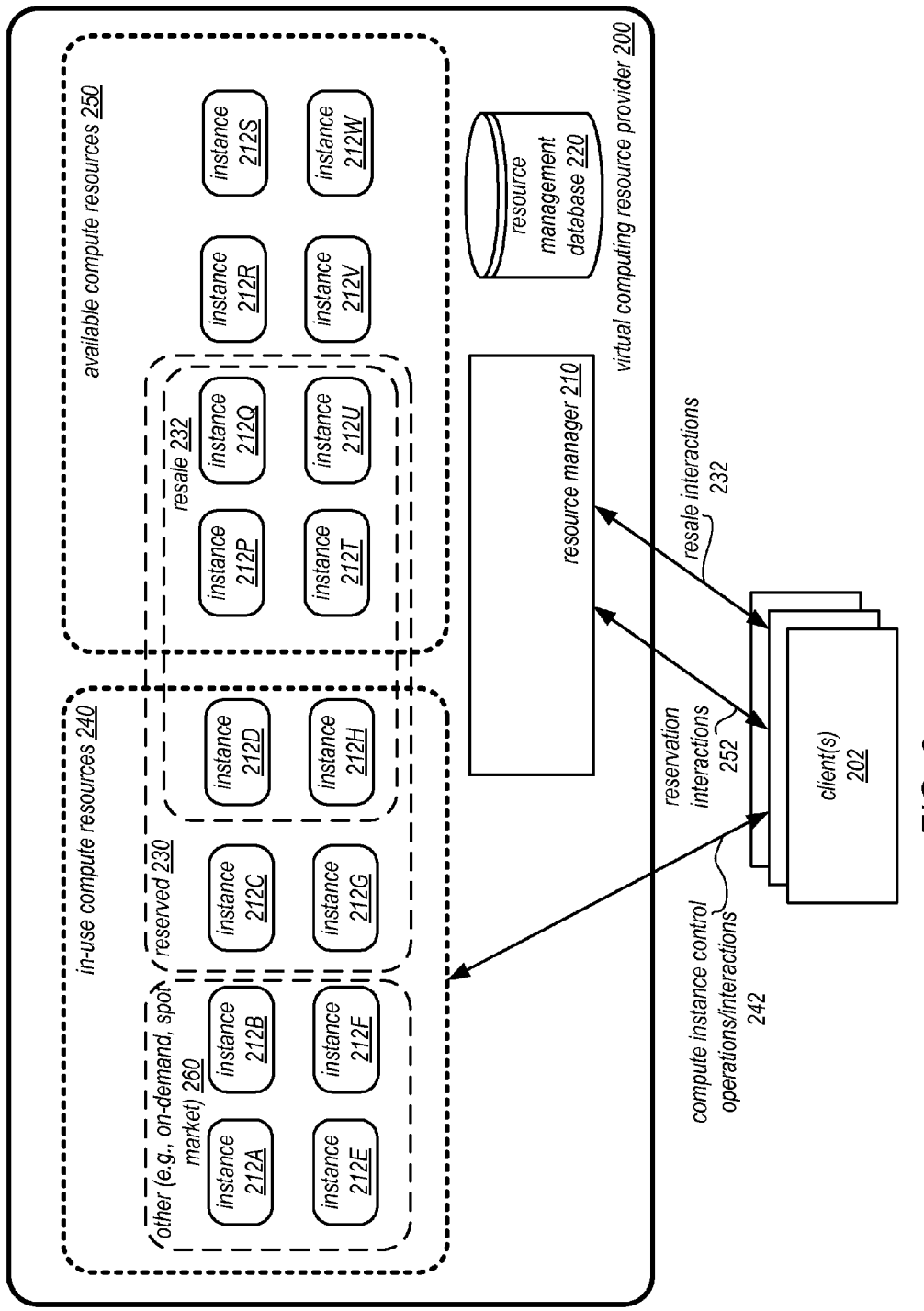
FIG. 2 is a block diagram illustrating a virtual computing resource provider that provides a marketplace to clients for reselling reserved compute instances to other clients, according to some embodiments.

FIG. 2 is a block diagram illustrating a virtual computing resource provider that provides a marketplace to clients for reselling reserved compute instances to other clients, according to some embodiments. Virtual computing resource provider 200 may be a provider network set up by an entity such as a company or a public sector organization to provide one or more services (such as various types of cloud-based computing or storage) accessible via the Internet and/or other networks to a clients. Such a virtual computing resource provider may include numerous data centers hosting various resource pools, such as collections of physical and/or virtualized computer servers, storage devices, networking equipment and the like, needed to implement and distribute the infrastructure and services offered by the virtual computing resource provider 200. The resources may in some embodiments be offered to clients in units called "instances," 212 such as virtual or physical compute instances or storage instances. A virtual compute instance 212 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 212 of the provider network in different embodiments, including general purpose or special purpose computer servers, storage devices, network devices and the like. In some embodiments clients 202 or user may be provided direct access to a compute instance 212, e.g., by giving a user an administrator login and password. Compute instances 212 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 212.

Compute instances 212 may be many different types or configurations based on several different dimensions in some embodiments, (and pricing policies associated with different classes may differ. Compute instances 212, in some embodiments, may be classified based in part on the timing or duration of instance allocations—i.e., on when instances are obtained by clients and when they are released by the clients, such as reserved instances 230, such as instances 212C, 212D, 212G, 212H, 212P, 212Q, 212T and 212U, or on-demand instances and spot-instances 260 (such as 212A, 212B, 212E, 212F, 212R, 212V, 212S, and 212W) each with respective pricing policies. In some embodiments, reserved compute instances 230 may be reserved for fairly long periods, such as a one-year term or a three-year term in accordance with the pricing policy, by paying a low, one-time, upfront payment for the instance, and then paying a low hourly rate for actual use of the instance at any desired times during the term of the reservation. Thus, a client 202 that reserved a reserved instance 230 may, by making the long-term reservation, be assured that its reserved instance will be available whenever it is needed.

For those clients 202 that do not wish to make a long-term reservation, the client may instead opt to use on-demand instances (or spot instances). The pricing policy for on-demand instances may allow the client 202 to pay for resource capacity by the hour with no long-term commitment or upfront payments. The client 202 may decrease or increase the resource capacity used, based on application needs, and may only have to pay the hourly rate for the instances used. In some cases the per-hour pricing for on-demand instances may be higher than the hourly rate for reserved compute instances 230, because the relatively long durations of reservations may provide a more stable revenue stream to the operator of the provider network than the potentially more dynamic revenue stream provided by on-demand instances. Spot instances may provide a third type of resource purchasing and allocation model. A spot pricing policy may allow a client 202 to specify the maximum hourly price that the client 202 is willing to pay, and the resource manager 210 may set a spot price for a given set of available compute resources 230 dynamically based on the prices clients are willing to pay and on the number of instances available to support the spot model. If a client 202's bid meets or exceeds the current spot price, an instance may be allocated to the client 202. If the spot price rises beyond the bid of the client 202 using a spot instance, access to the instance by the client 202 may be revoked (e.g., the instance may be shut down).

In some embodiments, compute instances have different types or configurations based on expected uptime ratios. The uptime ratio of a particular reserved compute instance may be defined as the ratio of the amount of time the instance is activated, to the total amount of time for which the instance is reserved. Uptime ratios may also be referred to as utilizations in some implementations. If a client expects to use a reserved compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. The previous descriptions is not intended to be limiting, but merely illustrative of the many different configurations possible for a compute instance 212 provided by virtual computing resource provider 200.

Virtual computing resource provider 200, a resource manager 210 may be implemented to manage computing resources provided by virtual computing resource provider 200. Resource manager 210 may implement any one of the various techniques described below with regard to FIGS. 6-11 in order to implement reconfiguring reserved compute instance marketplace offerings for requested reserved compute instance configurations. Virtual computing resource provider may be implemented by any combination of hardware and/or software on one or more servers or computing devices, such as computing system 2000 described below with respect to FIG. 12. In various embodiments, resource manager 210 may track or allocate resources between in-use compute resources 240 and available compute resources 250. Resource manager may maintain the compute resources so as to implement a marketplace for available compute resources 250. For example, in various embodiments resource manager 210 may implement an initial sale marketplace for available compute resources 250 that are not currently reserved 230 to a client 202, such as instances 212R, 212S, 212V, and 212W. Resource manager 210 may also implement a resale computing resource marketplace for reserved compute instances 230, such as compute instances 212D, 212H, 212P, 212Q, 212T, and 212U that are either in user 240 or available 250 and listed for resale 232. Resource manager 210 may be configured to access a resource management database 220 to store, manipulate, or update information pertaining to management of the resources provided by virtual computing resource provider 200.

Figure 3:
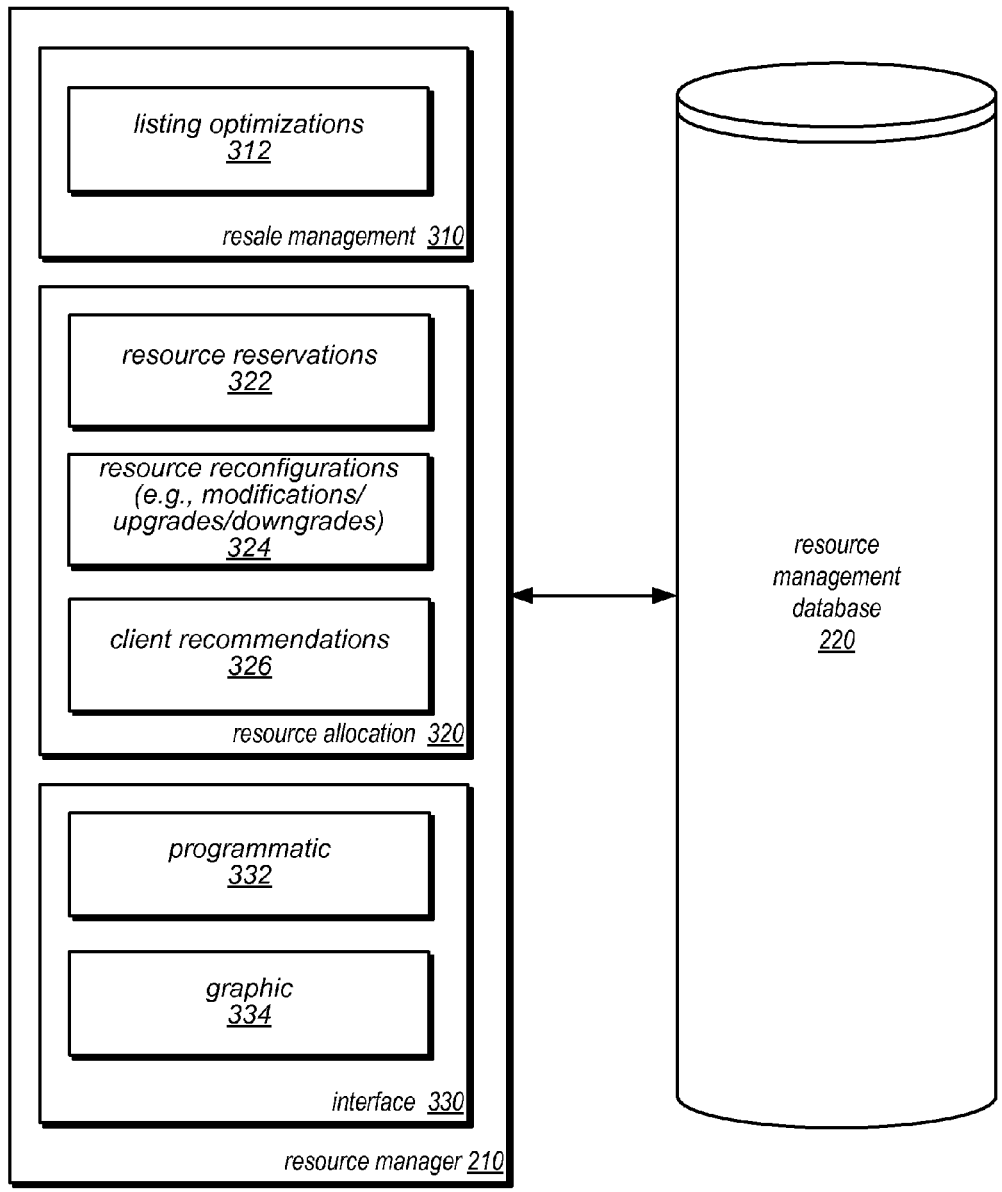
FIG. 3 is a block diagram illustrating a resource manager for a virtual computing resource provider that provides reconfigurable reserved compute instance offerings to clients requesting a specified instance configuration, according to some embodiments.

In various embodiments, resource manager 210 may implement a flexible set of resource reservation, control and access interfaces for clients 202. For example resource manager 210 may provide credentials or permissions to clients 202 such that compute instance control operations/interactions 242 between clients and in-use compute resources 240 may be performed. Resource manager 252 may also facilitate reservation interactions 252 and resale interactions 232 between clients 202 and compute instances for resale 232, or available in the initial sale marketplace for available compute resources 250. FIG. 3 is a block diagram illustrating a resource manager for a virtual computing resource provider that provides reconfigurable reserved compute instance offerings to clients requesting a specified instance configuration, according to some embodiments.

As illustrated in FIG. 3, resource manager 210 may implement a programmatic interface 332 (e.g., an Application Programming Interface (API)) or a graphical interface 334 (e.g., via a web site or a set of web pages) that allows clients to learn about, select, purchase access to, and/or reserve resource instances, either from an initial sale marketplace or a resale marketplace. It is noted that at least in some of the various embodiments discussed below, where an entity such as a resource manager 210 is described as implementing one or more programmatic interfaces such as a web page or an API, an interface module, such as interface module 330, of that entity may be responsible for the interface-related functionality. In some embodiments, an equivalent interface-related functionality may be implemented by a separate or standalone interface manager, external to the resource manager. Such an interface may include capabilities to allow browsing of listed reserved compute instances for resale (or initial sale), provide details and specifications of the different types or sizes of instances supported, the different reservation types or modes supported, pricing models, and so on.

Figure 11:
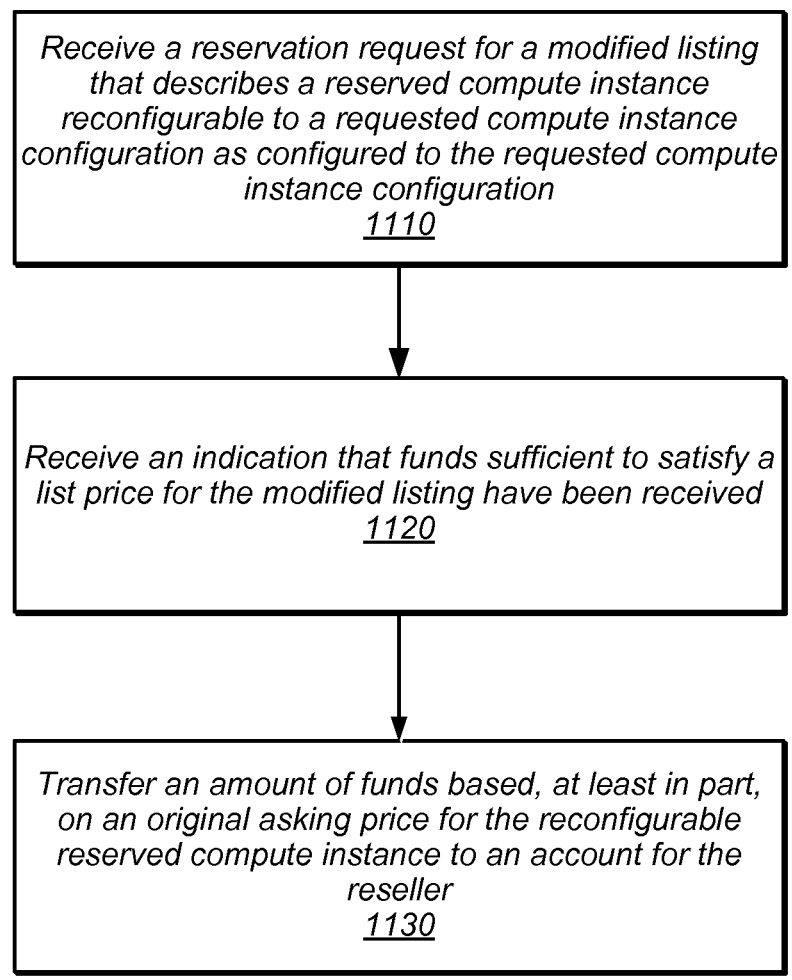
FIG. 11 is high-level flowchart illustrating various methods and techniques for transferring funds to a reseller for a modified listing that has been reserved, according to some embodiments.

Resource allocation module 320 may be implemented by resource manager 210 in order to handle management activities related to compute instances, such as resource reservations 322, resource reconfigurations 324, or client recommendations 326. Resource reservations module 322 may handle client requests and reservations related to the various marketplaces for purchase compute instances, such as the initial sale marketplace or resale marketplace. Various reservation requests either for listings, initial sale compute instances, or reserved compute instances available for resale may be received and processed by resource reservations module 322. Resource reservations 322 may also handle the various pricing schemes (at least for the initial sale marketplace) in various embodiments. For example, virtual computing resource provider 200 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance, and if the client's maximum price exceeded a dynamic spot price determined at least in part by supply and demand, that type of resource would be provided to the client. During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager 210 and may be allocated to some other client that is willing to pay a higher price. Other purchasing modes or combinations of modes may be implemented by the resource reservations module 322 in some embodiments. Detecting the receipt of funds for reservations, as well as directing transfer of funds to resellers may be implemented at resource reservations module 322. FIG. 11, described in detail below, provides examples of different functions or techniques resource reservations module 322 may implement for funds transfers. Resource reservations may also update resource management database 220 to reflect changes, such as changes in ownership, client use, or client accounts.

Resource reconfigurations module 324 may be configured to perform reconfigurations to reserved compute instances, such as those associated with modified resale listings generated by listing optimizations module 312. For example, modification operations may be one type of reconfiguration operation performed to reconfigure a reserved compute instance that may not incur any additional cost to virtual computing resource provider (e.g., moving a reserved compute instance from one availability zone to another). Upgrade operations may be another type of reconfiguration operation performed to reconfigure a reserved compute instance that may incur additional cost to virtual computing resource provider (e.g., upgrading to a higher utilization type of instance). Downgrade operations may be one type of reconfiguration operation performed to reconfigure a reserved compute instance that may leave a residual resource value to virtual computing resource provider (e.g., moving a reserved compute instance to a cheaper data center). Various other reconfigurations, such as adjusting the term length (either to a standardized offering or a customized length) may also be performed by resource reconfigurations module 324. Some reconfigurations may be requested by a client, while others may be performed behind the scenes such that client is unaware that a reserved compute instance has been reconfigured. Reconfigurations themselves may be performed, in some embodiments, by reconfiguring a pricing agreement for a reserved compute instance(s) in a resale listing.

In some embodiments, resource manager 210 may implement client recommendations module 326 in order to provide recommendations for client reservation of reserved compute instances in the resale marketplace and/or the initial sale marketplace according to an optimization goal. For example a client optimization goal may be lowest price with particular performance requirements. Client recommendations module 326 may determine a reserved compute instance resale listing (original or modified) that may satisfy the optimization goal and/or a particular configuration for a compute instance. Recommendations for compute instances may be made to clients by client recommendations module 326 based on various information about the client, such as client usage data. Various types of usage data sources from which the client recommendations module 326 obtains usage data to develop its recommendations may be employed in different embodiments. In some embodiments, where for example a client already uses some set of resource instances of the virtual computing resources provider, provider-side metrics agents deployed at various entities (such as resource instances, network devices and the like) within the virtual computing resources provider may serve as usage data sources for the pricing optimizer. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version, and so on, depending on the type of resource. Some or all of these may be used to generate client recommendations, in various embodiments.

In some embodiments, resource manager 210 may implement a resale management module 310 which may implement a resale marketplace for reserved compute instances. For example resale management module 310 may process and/or handle requests to create, modify, and/or remove reserved compute instance listings. Resale management module 310 may be configured to obtain listings or update listings information stored in resource management database 220. In some embodiments, resale management module may recommend or assist resellers with recommended asking prices for reserved compute instances, request or obtain authorization for performing reconfiguration on a reserved compute instance for sale (whether whole and/or partial reconfiguration or sale). A reseller may opt in to allow a resale management module 310 to automatically reconfigure a reserved compute instance held by the client for resale on a resale marketplace according in response to a selection of a modified listing associated with the reserved compute instance held by the reseller. For example, the resource manager may implement one or more programmatic interfaces (such as web pages, APIs or command-line interfaces) allowing clients to opt-in for the reconfigurations (both partial and/or total). If and when the listed resource instance is resold (e.g., when a different client reserves the listed instance), the instance may be removed from the marketplace listing, reconfigured according to the modified listing, removed from the set of resources reserved for the current owner (reseller), and/or assigned to the set of resources for reserved for the new owner (buyer). In some embodiments, a reseller may not be aware, opt-in, or authorize reconfiguration of the reserved compute instance, which may still be reconfigured if a modified listing including the reserved compute instance is sold.

Resale management module 310 may be configured to provide listings to clients 202 requesting resale listings. In various embodiments, client requests for listings of available reserved compute instances may include a specified instance configuration (using any one of the various configurations discussed above). Listing optimizations module 312 may be implemented, in various embodiments, to identify reserved compute instances available for resale that can be reconfigured to satisfy a specified instance configuration (e.g., particular type, size, location, term length, utilization ration, or performance characteristic). Listing optimizations module 312 may enforce various business rules or other policies limiting the types of reconfigurations. For example, a reserved compute instance may only be resized to another reserved compute instance of the same type (e.g., small general purpose instance to large general purpose instance). In another example, a reconfiguration operation to move a reserved compute instance form one location to another may be restricted based on a policy that limits number reserved compute instances in a particular location. The various types of reconfiguration operations, such as those described above with regard to reconfigurations module 324 (and below with regard to FIG. 9) may also provide limitations as to whether a reconfiguration may be possible. Some reserved compute instances may be combined or broken apart as part of reconfiguration (e.g., if 4 small instances equal 1 large, then the 4 small may be reconfigurable to the 1 large instance).

List optimizations module 312 may also be configured to generate modified listings for reconfigurable reserved compute instances available for resale. For example, the listing may be generated to describe the one (or multiple) reserved compute instance that is reconfigurable with a configuration (even though the reconfiguration has not yet been performed) that satisfies the specified instance configuration. In some embodiments, listing optimizations module 312 may be configured to determine a list price for a modified listing, such as described below with regard to FIG. 10.

Resource allocation module 320 may, in some embodiments, implement dynamically resizable pools of compute instances that may be set aside for the different reservation types or modes—e.g., long-term reserved instances may be allocated from one pool, on-demand instances from another, and so on (e.g., within available resources pool 250 in FIG. 2). As noted above, in some embodiments the virtual computing resource provider may be a network organized into a plurality of geographical regions, and each region may include one or more availability zones. Resource allocation module 320 may be responsible for changes moves between or changes to availability zones. An availability zone (which may also be referred to as an availability container herein) in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Turning back to FIG. 2, clients 202 may encompass any type of client configurable to submit requests to virtual computing resource provider 200, including resale interactions 232, reservation interactions, and/or compute instance control operations/interactions 242. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture.

In some embodiments, a client 202 (e.g., a computational client) may be configured to provide access to a compute instance 212 in a manner that is transparent to applications implement on the client 202 utilizing computational resources provided by the compute instance 212. In such an embodiment, applications may not need to be modified to make use of FIG. 2. Instead, the details of interfacing to virtual computing resource provider 200 may be coordinated by client 202 and the operating system or file system on behalf of applications executing within the operating system environment at a client 202.

Clients 202 may convey network-based services requests virtual computing resource provider 200 via a network. In various embodiments, a network may encompass any suitable combination of networking hardware and protocols necessary to establish network-based communications between clients 202 and virtual computing resource provider 200. For example, a network may generally encompass the various telecommunications networks and service providers that collectively implement the Internet. A network may also include private networks such as local area networks (LANs) or wide area networks (WANs) as well as public or private wireless networks. For example, both a given client 202 and virtual computing resource provider 200 may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 202 may communicate with virtual computing resource provider 200 using a private network rather than the public Internet.

Figure 4:
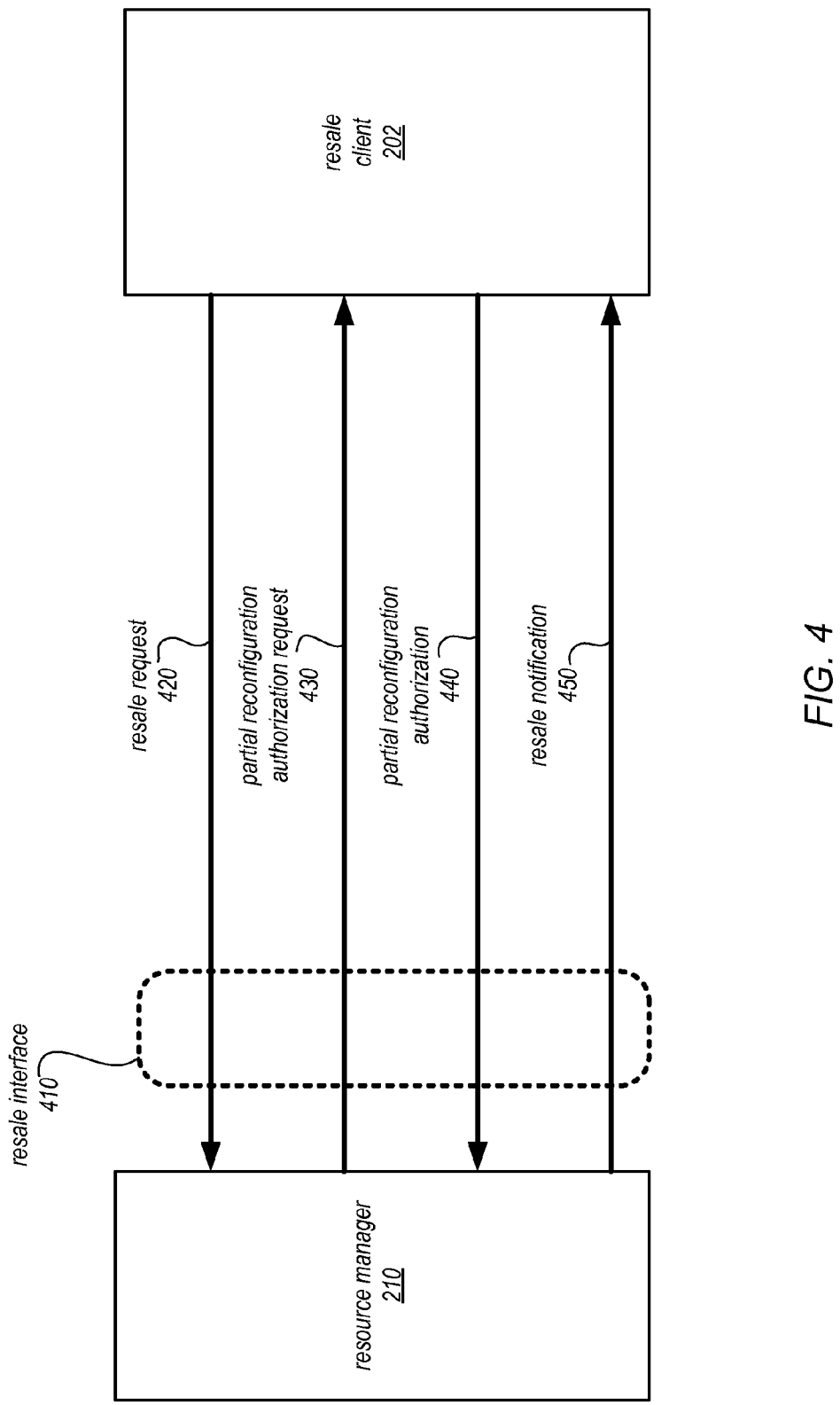
FIG. 4 is a block diagram illustrating interactions between a resale client and a resource manager for a virtual computing resource provider that provides reconfigurable reserved compute instance offerings to clients requesting a specified instance configuration, according to some embodiments.

FIG. 4 is a block diagram illustrating interactions between a resale client and a resource manager for a virtual computing resource provider that provides reconfigurable reserved compute instance offerings to clients requesting a specified instance configuration, according to some embodiments. A resale client 202, as described above in FIG. 2, may be configured to send various requests related to the reselling of reserved compute instances in the resale marketplace for reserved compute instances provided by virtual computing resource provider 200. Communications from resale client 202 may be formatted or sent according to a resale interface 410 (e.g., a set of API commands).

Resale client 202 may send a resale request 420 to resource manager 210. The resale request may indicate a particular one or more reserved compute instances currently held by resale client 202 to be listed for resale in the resale marketplace. In some embodiments, separate request may indicate an asking price for respective reserved compute instances and/or may include an opt-in for performing automatic reconfiguration to for resale specific to a specified compute instance configuration of a potential buyer. In some embodiments, however, an opt-in to reconfiguration may not be sent. Resource manager 210 may be configured to send authorization requests to participate in reconfiguration for resale to resale client 202. For example, resource manager 210 may send a partial reconfiguration authorization request 430 to resale client 202 in order to obtain authorization for a resale reconfiguration that does not sell all of the term and/or resources included in the current listing for the reserved compute instance. Partial reconfiguration authorization 440 (or consent to any reconfiguration) may be sent back to resource manager 210. Upon sale of the listing (whether reconfigured or originally configured), a resale notification 450 may be sent from resource manager 210 to resale client 202. Other information, such as funds transferred to resale client account, the amount of funds (e.g., full asking price or prorated share), and other sale related information may be included with resale notification 450.

Figure 5:
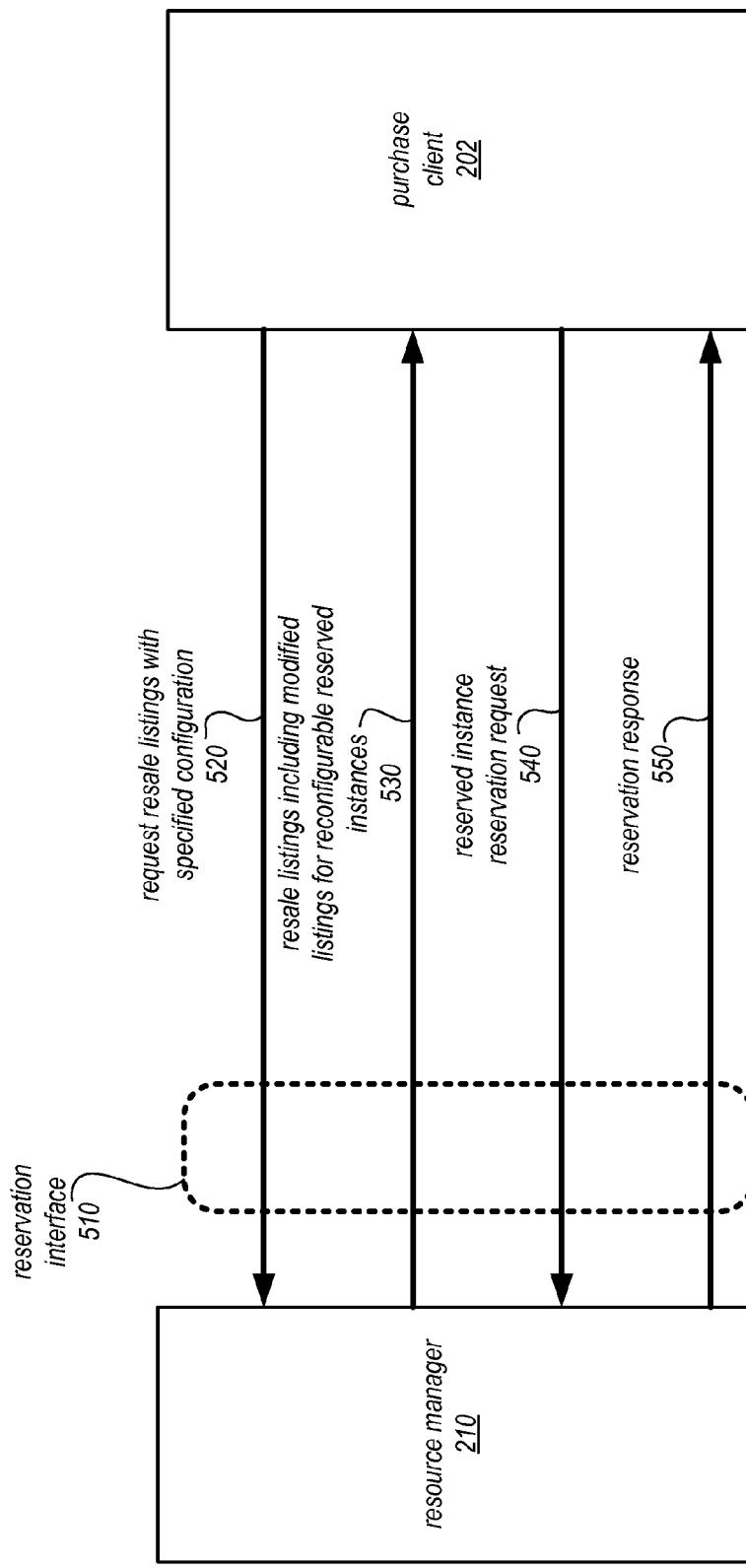
FIG. 5 is a block diagram illustrating interactions between a buying client and a resource manager for a virtual computing resource provider that provides reconfigurable reserved compute instance offerings to clients requesting a specified instance configuration, according to some embodiments.

FIG. 5 is a block diagram illustrating interactions between a buying client and a resource manager for a virtual computing resource provider that provides reconfigurable reserved compute instance offerings to clients requesting a specified instance configuration, according to some embodiments. A purchase client 202, as described above in FIG. 2, may be configured to send various requests related to the request for listings and reservation of resale listings in the resale marketplace for reserved compute instances provided by virtual computing resource provider 200. Communications from purchase client 202 may be formatted or sent according to a reservation interface 510 (e.g., a set of API commands).

A purchase client 202 may send a request for resale listings with a specified reserved compute instance configuration 520 to resource manager 210. The specified instance configuration may include one or more characteristics of a reserved compute instance, such as term length, size or performance capacity, type (e.g., specific purpose, such as optimized for graphics processing, memory, storage, etc. . . . , or a type of use, such as heavy, medium, or light utilization, type of software or other applications running on the reserved compute instance (e.g., a specific operating system), or a location (e.g., particular data center, or geographic region). Resource manager 210 may obtain the listings including modified listings according to the various techniques described below with regard to FIGS. 6-10, and send resale listings including modified listings for reconfigurable reserved instances 530 back to purchase client 202. These listings may take the form of information, html, or other code, which purchase client 202 may use to display a listing, such as in a GUI window or web page to a user of purchase client 202, in some embodiments. Based on the listings, purchase client may identify one or more listings to reserve (purchase) and send a reserve instance reservation request 540 to resource manager 210. If the reservation request is successful (e.g., a requested listing has not been purchased by another client), then a reservation response 550 indicating success may be sent. Such a response may include access information for purchase client 202 to use the reserved instance. A failure indication may be sent as the response 550 if the reservation did not successfully complete (e.g., payment problem).

Figure 6:
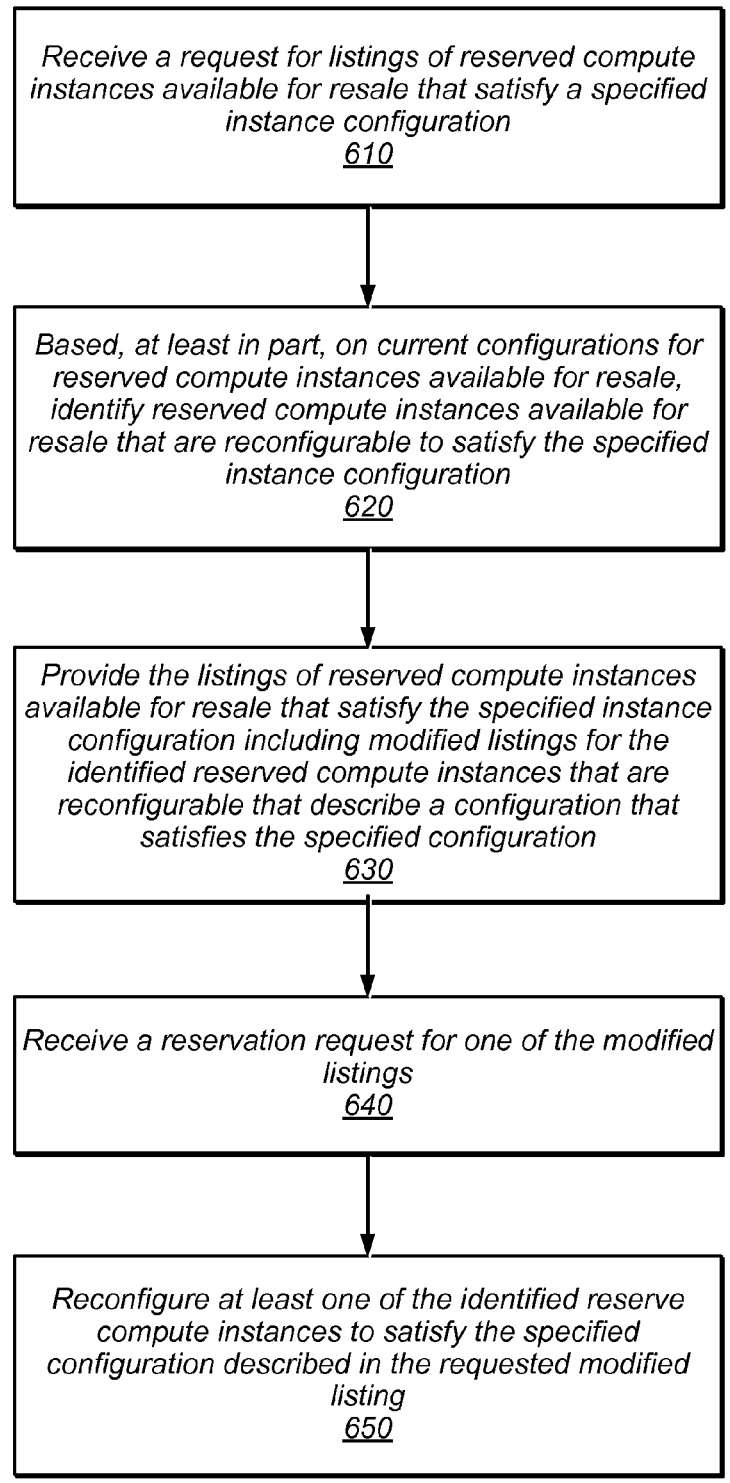
FIG. 6 is a high-level flowchart illustrating various methods and techniques for reconfiguring reserved compute instance marketplace offerings for requested reserved compute instance configurations, according to some embodiments.

The examples of reconfiguring reserved compute instance marketplace offerings for requested reserved compute instance configurations discussed above with regard to FIGS. 2-5 have been given in regard to a virtual computing resource provider. Various other types or combinations of systems may implement these techniques. For example, recommendation service may provide purchase recommendations to a client and request that a virtual computing resource provider make the requested reconfigurations. FIG. 6 is a high-level flowchart illustrating various methods and techniques for reconfiguring reserved compute instance marketplace offerings for requested reserved compute instance configurations, according to some embodiments. These techniques may be implemented using a resource manager or other component of virtual computing resource provider as described above with regard to FIGS. 2-5, as well as otherwise configured reserved compute instance resale marketplaces that may implement the described techniques.

As indicated at 610, a request for listings of reserved compute instances available for resale that satisfy a specified instance configuration may be received, in various embodiments. The configuration may specify some or all of the various components of reserved compute instance configuration, such as term length, size or performance capacity, type (e.g., specific purpose, such as optimized for graphics processing, memory, storage, etc. . . . , or a type of use, such as heavy, medium, or light utilization, type of software or other applications running on the reserved compute instance (e.g., a specific operating system), or a location (e.g., particular data center, or geographic region). The specified instance configuration may, in some embodiments provide a set of acceptable attributes (e.g., medium or high utilization) or various combinations of reserved compute instances (e.g., 1 large or 4 small).

Figure 9:
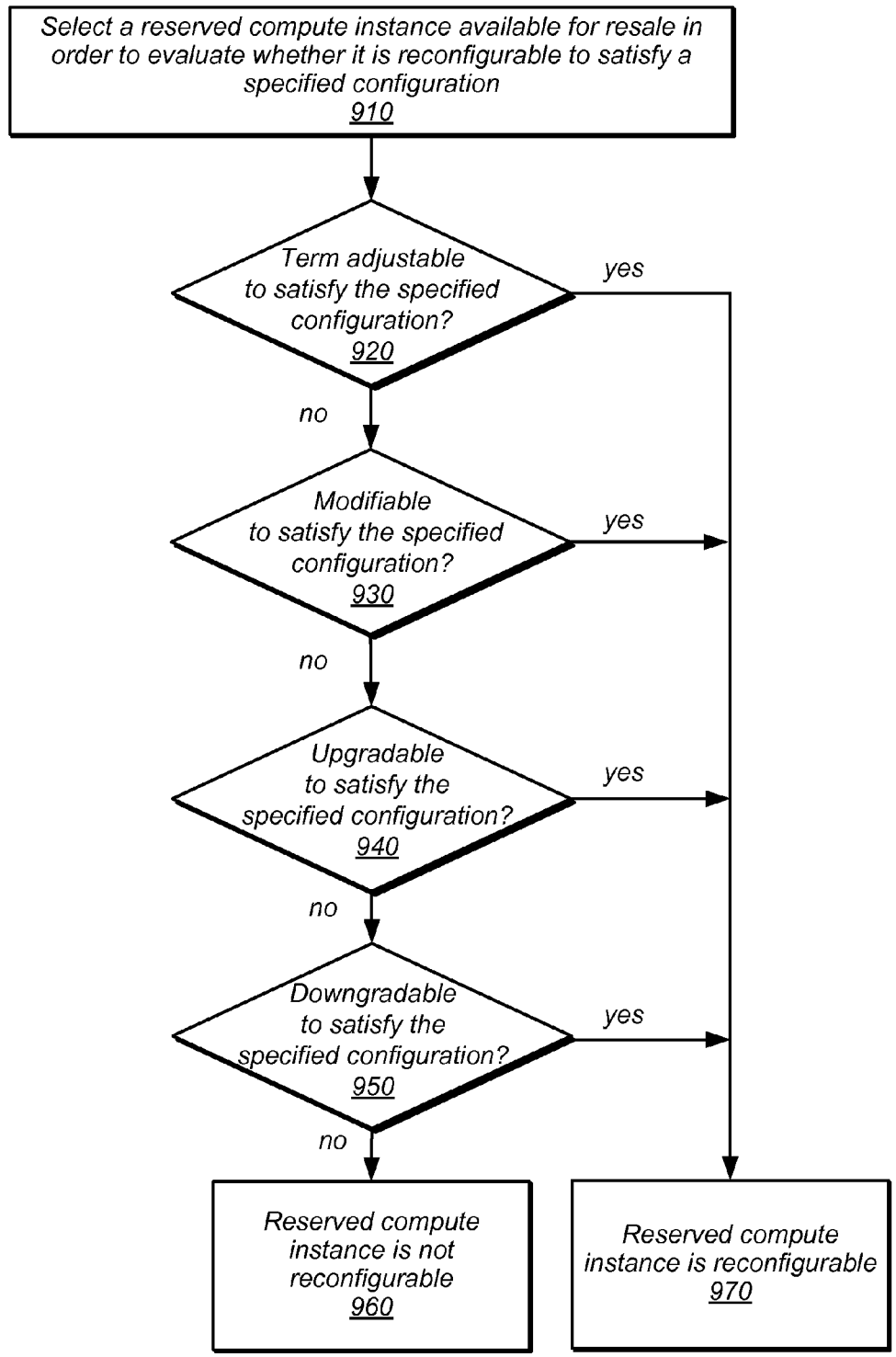
FIG. 9 is high-level flowchart illustrating various methods and techniques for identifying reconfigurable reserved compute instances for a specified reserved compute instance configuration, according to some embodiments.

As indicated at 620, based, at least in part, on current configurations for reserved compute instances available for resale, reserved compute instances available for resale that are reconfigurable to satisfy the specified instance configuration may be identified, in various embodiments. For example a rules based engine, applying reconfiguration policies, may be employed to determine which combination of one or more reconfiguration operations may be performed to determine whether the specified configuration may be satisfied. As noted above, in some embodiments, the specified configuration may be multiple different acceptable configurations, and thus identification techniques may be performed for each configuration. FIG. 9, described in detail below, provides further examples of various techniques for identifying reconfigurable reserved compute instances available for resale that satisfy the specified configuration. Reconfigurable reserved compute instances may be only partially reconfigurable, leaving some remaining term length or remaining compute resource unsold, in some embodiments. Reserved compute listings may also reconfigured as combination of two reserved compute listings, in some embodiments.

As indicated at 630, in various embodiments, the listings of reserved compute instances available for resale that satisfy the specified instance configuration including modified listings for the identified reserved compute instances that are reconfigurable may be provided for reservation by a client. In some embodiments, the modified listings may describe a reserved compute instance that is reconfigurable to satisfy the specified configuration, as already reconfigured to have the specified instance configuration. Thus, in some embodiments, the purchaser is unaware that the listing is a modified listing. In some embodiments some provided listings may be original listings while others are modified. In at least some embodiments, all of the provided listings are modified listings.

In some embodiments, the listings may be provided as inputs to a cost optimizer or other client recommendation engine such that client recommendations may be determined by including the possibility of the reconfigurable reserved compute instances in the resale marketplace when optimizing for a client optimization goal. Listings may also be provided alongside information for initial sale pricing for reserved compute instances from an initial sale marketplace for reserved compute instances. For example, a reservation request for a reserved compute instances with the specified instance configuration may be received and held, while the resale listings may be provided to a purchase in order to provide alternative pricing information, in some embodiments.

As indicated at 640, in some embodiments, a reservation request for one of the modified listings may be received. In response to receiving the reservation request, at least one of the identified reserved compute instances described in the modified listing may be reconfigured, as indicated at 650. For example, if modified listing of a reserved compute instance with a 1 year term is requested, then a 9 month term reserved compute instance associated with the modified listing may be reconfigured to have a 12 month term. Other reconfiguration operations, such as modification, upgrades, and downgrades described in further detail below with regard to FIG. 9 may be performed. Once payment is received, in various embodiments, access may be provided to the purchase for the reconfigured reserved compute instance.

Figure 7:
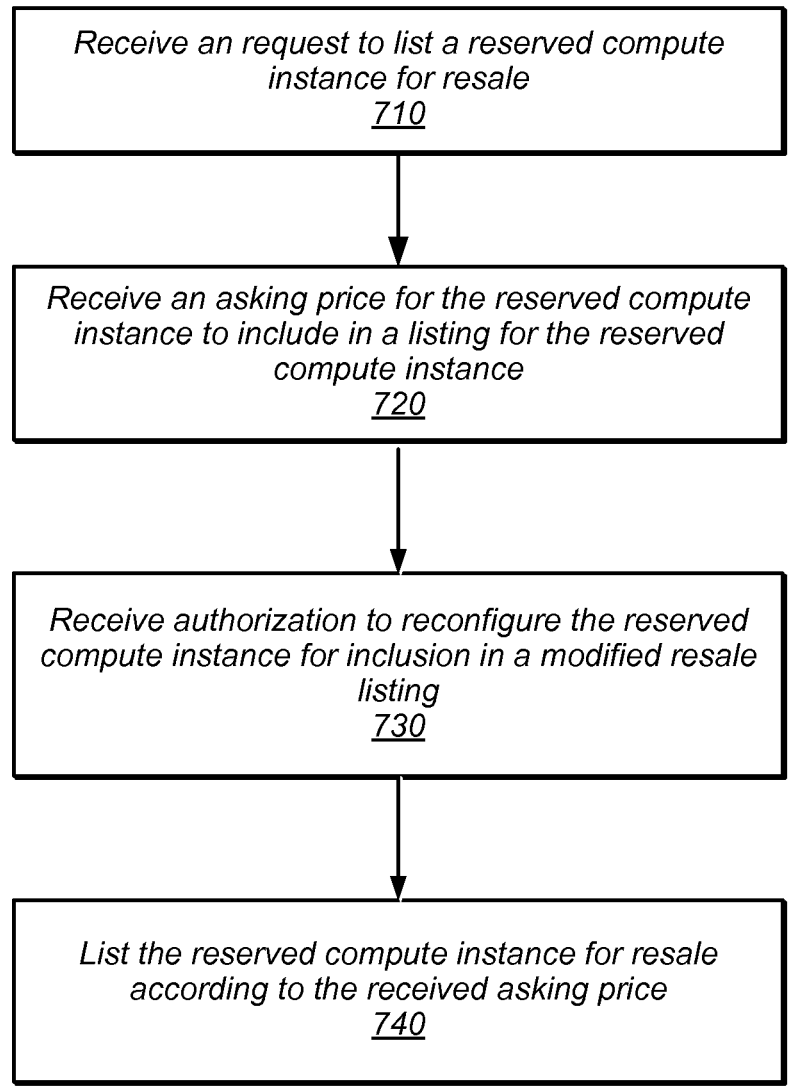
FIG. 7 is high-level flowchart illustrating various methods and techniques for listing a reserved compute instance for resale at a virtual computing resource provider, according to some embodiments.

As discussed above, a reseller may first list a reserve compute instance for resale in a resale marketplace. FIG. 7 is high-level flowchart illustrating various methods and techniques for listing a reserved compute instance for resale at a virtual computing resource provider, according to some embodiments. As indicated at 710, a request may be received to list a reserved compute instance for resale, in various embodiments. The request may identify one or more reserved compute instances currently held by the reseller. As indicated at 720, an asking price for the reserved compute instance to include in a listing for the reserved compute instance may be received. For example, a sale price recommendation engine may provide a suggested sale price, which a client may accept, reject, or modify, and then send back a response including the asking price. As indicated at 730, in some embodiments, authorization may be received to reconfigure the reserved compute instance for inclusion in a modified resale listing. For example, the reseller may opt-in for either all reconfigurations, total reconfigurations, or partial reconfigurations. Then, as indicated at 704, the reserved compute instance may be listed according to the received asking price, in various embodiments.

Figure 8:
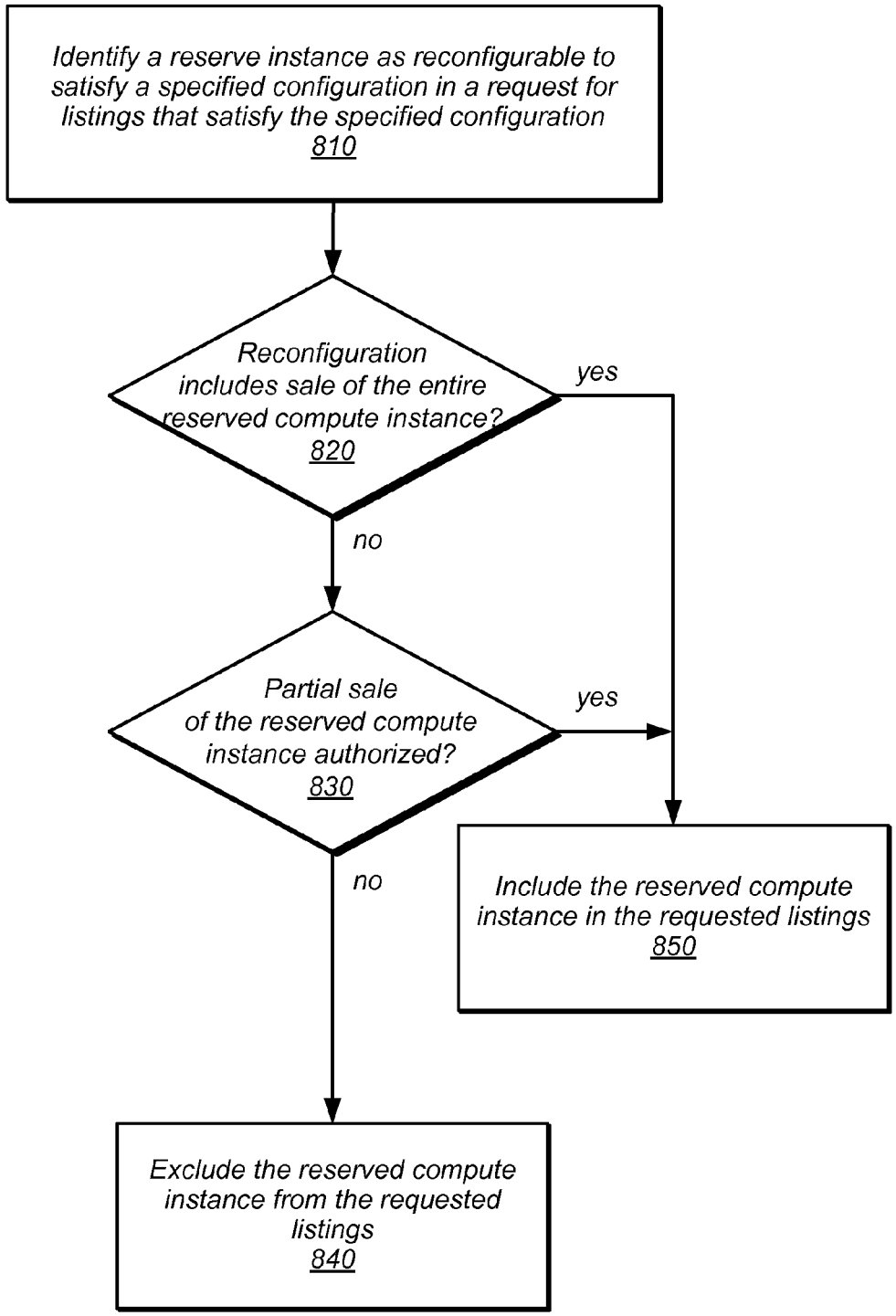
FIG. 8 is high-level flowchart illustrating various methods and techniques for determining whether a reserved compute instance listed for resale at a virtual computing resource provider that is reconfigurable to a requested reserved instance configuration can be included in a modified listing, according to some embodiments.

As discussed above, in some embodiments only a portion of listed reserved compute instance for resale may be reconfigurable to be sold. FIG. 8 is high-level flowchart illustrating various methods and techniques for determining whether a reserved compute instance listed for resale at a virtual computing resource provider that is reconfigurable to a requested reserved instance configuration can be included in a modified listing, according to some embodiments. As indicated at 810, a reserve instance may be identified as reconfigurable to satisfy a specified configuration in a request for listings that satisfy the specified configuration, in various embodiments. A determination may then be made, as indicated at 820, whether the reconfiguration includes a sale of the entire reserved compute instance. If yes, as indicated by the positive exit, the reserved compute instance may be included in the requested listings. For example, in some embodiments, resale listings are authorized by default to reconfigure the reserved compute instance if the entire reserved compute instance can be sold. If not, a determination may be made as to whether a partial sale of the reserved compute instance is authorized, as indicated at 830. For example, in some embodiments, a reseller may authorize partial sales at the time of listing the reserved compute instance, or at a later time. In some embodiments, the authorization may include a minimum profit amount from the partial sale, which may authorize only partial sales that would generate a profit to the reseller at or about the minimum profit amount. In some embodiments, authorization may be requested in response to a reservation request including a partial sale of the reserved compute instance. Authorized partial sales, as indicated by the positive exit to 850, may include the reserved compute instance in the requested listings. Otherwise, as indicated at the negative exit to 840, the reserved compute instance may be excluded from the requested listings.

As discussed above, reserved compute instances can be configured in many different ways. Listings of reserved compute instances available for resale may first be obtained. Those listings that already satisfy a specified instance configuration without reconfiguration may be easily identifiable. FIG. 9 is high-level flowchart illustrating various methods and techniques for identifying reconfigurable reserved compute instances for a specified reserved compute instance configuration, according to some embodiments. The techniques discussed below may be implemented to evaluate some or all of the available listings. Some listings may be excluded from the evaluation, in some embodiments. For example, listings from resellers that have not authorized reconfiguration for resale of their reserved compute instances.

As indicated at 910, a reserved compute instance available for resale may be selected in order to evaluate whether it is reconfigurable to satisfy a specified configuration, in various embodiments. Resale marketplace rules or policies may, in some embodiments, eliminate some listings that may otherwise be reconfigurable. Lack of authorization, as noted above, length of time listed (recently listed), insufficient remaining term length, or specially priced (e.g., originally discounted) reserved compute instances are some examples of policies that might be used, in various embodiments, to exclude some listings from evaluation.

In some embodiments, as illustrated at 920, if the term length for the reserved compute instance is adjustable to satisfy the specified condition, then the reserved compute instance is reconfigurable (as indicated by the positive exit to 970). For example, if the specified term length is 1 year and the listed term length is 9 months, a three month adjustment to the term length may be made. Similarly, if a 1 year term length is specified, and a 14 month term length is listed, a 2 month adjustment to remove the months from the term may be made. In various embodiments, some term adjustment restrictions may be enforced. For example, if a term remainder is less than a common term unit (e.g., month or year), then the term may not be adjusted and leave only the small remainder (e.g., 10 days). Another example restriction may be that term adjustments can only be increases (not decreases), or that a term length can only be adjusted to a standardized term length (such as may be offered by the initial sale marketplace, 1 year, 6 months, etc. . . . ).

Another reconfiguration determination may be made as to whether the reserved compute instance may be modifiable to satisfy the specified configuration, as indicated at 930. If yes, then the reserved compute instance is reconfigurable (as indicated by the positive exit to 970). In various embodiments, modification operations may be operations that do not incur a cost to the virtual computing resource provider. For example, if the resource provider merely is changing metadata or affiliation information for a reserved compute instance (e.g., relocating the reserved compute instance to a different availability zone in a same region), or loading different software (e.g., such as an operating system or application, changing a network platform for the instance) on the reserved compute instance, then no cost may be incurred. Similarly, a rearrangement of compute resources, such as changing the instance type or size within a same instance family (e.g., instances with the same purpose, such as general compute, storage, etc. . . . ) may also be modifiable in various embodiments. Again, as noted above, some restrictions or policies may limit modifications, such as modifications to a different instance type in a different instance family, or a move to a different region may violate reconfiguration policies.

As indicated at 940, another reconfiguration determination may be made as to whether a reserved compute instance is upgradeable to satisfy the specified configuration, in various embodiments. If yes, then the reserved compute instance is reconfigurable (as indicated by the positive exit to 970). In various embodiments, an upgrade operation may incur some cost to a virtual computing resource provider. For example, the difference in configuration may be a difference in the utilization type of an instance (e.g., from light to heavy). Changing to the new utilization type may incur a cost for the virtual computing resource provider (e.g., different rate revenue, less capacity, etc. . . . ). Another upgrade may be a location change between a less expensive location to more expensive location. Restrictions or policies may be applied to prevent otherwise performable upgrades. For example, in some embodiments, an upgrade cost limit may be imposed (e.g., so that an upgrade is not so expensive that the cost cannot be recouped by a sale in the resale market).

As indicated at 950, another reconfiguration determination may be made as to whether a reserved compute instance is downgradable to satisfy the specified configuration, in various embodiments. If yes, then the reserved compute instance is reconfigurable (as indicated by the positive exit to 970). In various embodiments, an downgrade operation may incur some residual resource value to the virtual computing resource provider. For example, the difference in configuration may be a difference in the utilization type of an instance (e.g., from heavy to light). Changing to the new utilization type may incur a residual for the virtual computing resource provider (e.g., different rate revenue, more capacity, etc. . . . ). Another downgrade may be a location change between a more expensive location to less expensive location. Restrictions or policies may be applied to prevent otherwise performable downgrades. For example, in some embodiments, a residual value limit may be imposed.

The various different evaluations at 910, 920, 930, and 940, may be performed in various orders with one or more other evaluations removed. For example, reconfiguration may be determined if a reserved compute instances is either term adjustable or modifiable (upgrades and downgrades may not be reconfiguration options). Moreover, in some embodiments, even if a reserved compute instance is identified as reconfigurable, other policies, such as a limit on the number of reconfiguration operations for a listing, may be imposed to exclude the reserved compute instance. Thus, the examples discussed above are not intended to be limiting as to the various other ways reserved compute instances may or may not be considered reconfigurable.

Figure 10:
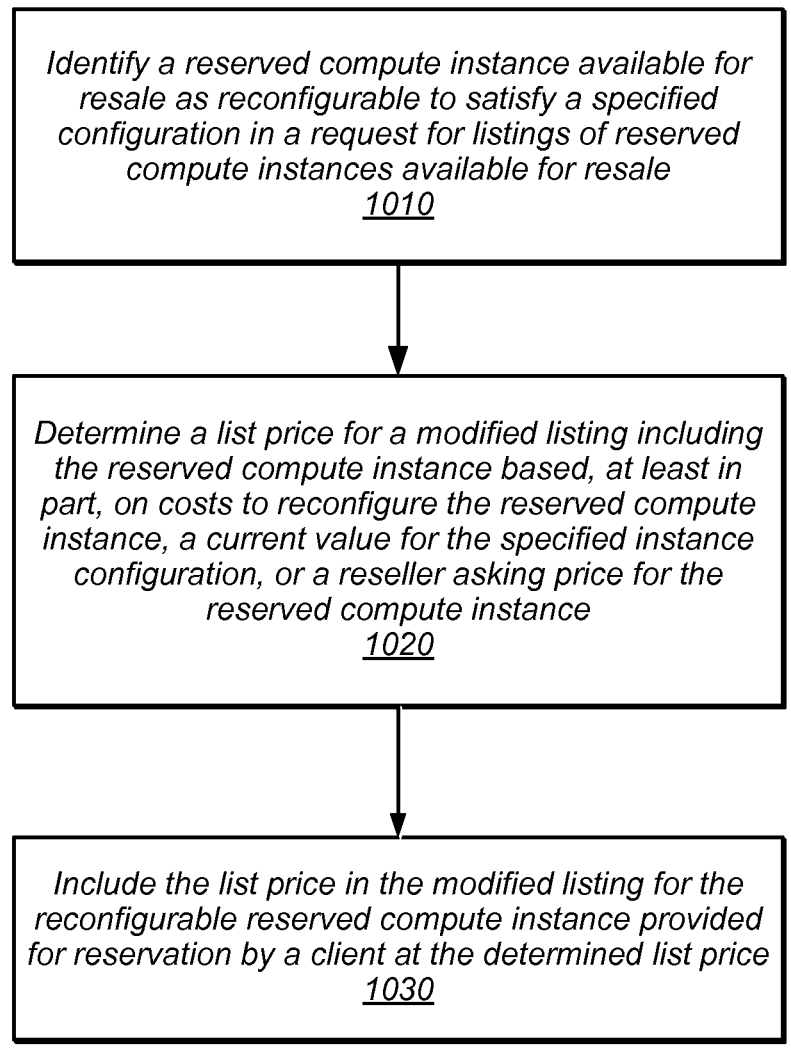
FIG. 10 is high-level flowchart illustrating various methods and techniques for determining list prices for modified listings to provide a client for reservation, according to some embodiments.

The reconfigurable reserved compute instances, identified as described above with regard to FIG. 9, may be associated with modified listings generated and included with listings sent provided for reservation by a client. As various pricing factors for the reserved compute instance may have changed, either since the compute instance was first reserved by the reseller or listed by the reseller, a determination may be made as to a new list price for the modified listing. FIG. 10 is high-level flowchart illustrating various methods and techniques for determining list prices for modified listings to provide a client with for reservation, according to some embodiments.

As indicated at 1010, in various embodiments, a reserved compute instance available for resale may be identified as reconfigurable to satisfy a specified configuration in a request for listings of reserved compute instances available for resale, in various embodiments. A list price may then be determined for a modified listing including the reserved compute instance may be determined, as indicated at 1020. In various embodiments, the list price may be determined on various factors including, but not limited to, costs to reconfigure the reserved compute instance (e.g., how much to upgrade, downgrade, downtime for the instance to perform reconfiguration), a current value for the specified instance configuration (e.g., at the initial sale market for reserved instance, on-demand, or spot market value), and/or a reseller asking price (e.g., may ensure that a fixed percentage over the reseller asking price is obtained) for the reserved compute instance. In some embodiments, a list price may include multiple elements. For example, a reservation fee, and a usage rate at for which the owner pays for usage (e.g., by the hour). In some embodiments, the original usage rate may be averaged with a new usage rate for the remaining time period (e.g., based on current usage rates for the specified configuration of instance). Alternatively, 2 rates for two different time periods may be listed, in some embodiments.

As indicated at 1030, the determined list price may be included in the modified listing for the reconfigurable reserved compute instance provided for reservation by a client at the determined list price. In some embodiments, the reseller may not be aware of (or have veto power over) the determined list price, and whether or not it is included in the modified listing. Alternatively, in some embodiments, the reseller may approve a new list price (e.g., in order to ensure that the new list price is competitive for resale). The modified listing itself, may not, in various embodiments, break down the portions of the list price associated with or additions to the original asking price.

As discussed above, a reserved compute instance resale marketplace provides resellers with opportunities to recover some costs for investing in unused compute resources provided by reserved compute instances. Modified listings may, in various embodiments, have a list price different from (e.g., higher than) an original asking price for the reserved compute instance prior to reconfiguration. Thus, a determination may be made as to the amount of funds to provide the reseller in the event of a reservation/purchase of a modified listing that is associated with a reserved compute instance listed by a reseller. FIG. 11 is high-level flowchart illustrating various methods and techniques for transferring funds to a reseller for a modified listing that has been reserved, according to some embodiments.

As indicated at 1110, a reservation request for a modified listing that describes a reserved compute instance reconfigurable to a requested compute instance configuration as configured to the requested compute instance configuration is received, in various embodiments. In some embodiments, the reservation request may include payment information and/or authorization from a purchasing client. In some embodiments, a payment protocol, workflow, or service may be initiated. For example, a GUI interface may be generated at a purchase client at which payment information (e.g., method, account number, etc. . . . ) may be entered and a transaction using the payment information processed. Or, in some embodiments, a billing service or system may obtain information previously registered for the purchase client, and debit the list price funds. However performed, an indication may be received that funds sufficient to satisfy a list price for the modified listing have been received, as indicated at 1120.

A determination may be made as to the amount of funds to be transferred to a reseller. For example, it the entire reserved compute instance was sold, then the amount to transfer may simply be the original asking price provided by the reseller (from which a service fee may possibly be subtracted). More sophisticated determinations may be made if, for example, only a partial sale of the reserved compute instance occurred. For example, if 6 out of 7 months were sold, then a prorated portion (e.g. 6/7) of the original asking price (from which a service fee may possibly be subtracted). In another example, if a reserved compute instance was downgraded to a lower utilization type, then an estimated value on lost usage fees may be debited from the original asking price. Once determined, an amount of funds, based, at least in part, on the original asking price for the reconfigurable reserved compute instance may be transferred to an account for the reseller, as indicated at 1130. For example, an account maintained for reserving compute instances at a virtual computing resource provider associated with the reseller may be credited with the funds.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the virtual computing resource provider described herein). The various methods as illustrated in the figures and described herein represent example embodiments of methods. The order of any method may be changed, and various elements may be added, reordered, combined, omitted, modified, etc.

Embodiments of implementing reconfigurable reserved compute instance marketplace offerings for a requested reserved compute instance configuration as described herein may be executed on one or more computer systems, which may interact with various other devices. FIG. 12 is a block diagram illustrating an example computer system, according to various embodiments. For example, computer system 2000 may be configured to implement nodes of a virtual compute instance, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the system described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a virtual computing resource provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("REST-ful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of computing devices implementing reserved compute instances for clients of a virtual computing resource provider;
a resource manager, implemented on one or more computing devices, for the virtual computing resource provider, configured to:
reserve at least one compute instance for each of a plurality of current owners for a specified length of time;
receive a request for respective listings of different ones of a plurality of reserved compute instances that satisfy a specified instance configuration from a computing device of a client, wherein each of the different ones of the plurality of reserved compute instances are reserved to a corresponding owner of the plurality of current owners for corresponding specified lengths of time;
based, at least in part, on respective current configurations for each of the plurality of reserved compute instances, identify one or more reserved compute instances that are reconfigurable to satisfy the specified instance configuration;
provide, to the computing device of the client, the listings for the different ones of the plurality of reserved compute instances that satisfy the specified instance configuration including one or more modified listings for the identified one or more reserved compute instances that are reconfigurable to satisfy the specified instance configuration, wherein the one or more modified listings each describe a configuration that satisfies the specified instance configuration;
receive, from the computing device of the client, a reservation request for one of the one or more modified listings;
in response to receiving the reservation request from the computing device of the client:
reconfigure at least one of the identified one or more reserved compute instance in order to satisfy the specified instance configuration as described in the requested modified listing; and
provide access to the reconfigured at least one reserved compute instance to the computing device of the client.

2. The system of claim 1, wherein the specified instance configuration includes a reservation term length that is greater than a reservation term length for the at least one identified reserved compute instance, and wherein to reconfigure the at least one of the identified reserved compute instance in order to satisfy the specified instance configuration as described in the requested modified listing, the resource manager is configured to:
extend the reservation term length for the at least one identified reserve compute instance to equal the reservation term length included in the specified instance configuration.

3. The system of claim 1,
wherein the requested modified listing for the at least one identified reserved compute instance describes a configuration with:
a reservation term length less than a reservation term length in an original listing for the at least one identified reserved compute instance submitted by the corresponding current owner of the at least one identified reserved compute instance; or
a computational resource amount less than an original computational resource amount in the original listing for the at least one identified reserved compute instance submitted by the corresponding current owner of the at least one identified reserved compute instance;
wherein the resource manager is further configured to:
prior to providing the listings for the different ones of the plurality of reserved compute instances that satisfy the specified instance configuration including the one or more modified listings for the identified one or more reserved compute instances that are reconfigurable to satisfy the specified instance configuration to the computing device of the client, verify authorization of the corresponding current owner of the at least one identified reserved compute instance described in the requested modified listing.

4. The system of claim 1, wherein each of the plurality of reserved compute instances provides the corresponding current owner of the reserved compute instance direct access to the reserved compute instance.

5. A method, comprising:
performing, by one or more computing devices:
reserving at least one compute instance for each of a plurality of current owners for a specified length of time;
receiving a request, at a virtual computing resource provider, for respective listings of different ones of a plurality of reserved compute instances that satisfy a specified instance configuration, wherein each of the different ones of the plurality of reserved compute instances are reserved to a corresponding owner of the plurality of current owners for specified lengths of time;
based, at least in part, on respective current configurations for each of the plurality of reserved compute instances, identifying one or more reserved compute instances that are reconfigurable to satisfy the specified instance configuration;
providing the listings for the different ones of the plurality of reserved compute instances including one or more modified listings for the identified one or more reserved compute instances that are reconfigurable to satisfy the specified instance configuration for reservation by a computing device of a client, wherein the one or more modified listings each describe a configuration that satisfies the specified instance configuration
receiving, from the computing device of the client, a reservation request for one of the one or more modified listings;
in response to receiving the reservation request from the computing device of the client:
reconfiguring at least one of the identified one or more reserved compute instances in order to satisfy the specified instance configuration as described in the requested modified listing; and
providing access to the reconfigured at least one reserved compute instance to the computing device of the client.

6. The method of claim 5, further comprising evaluating the provided listings to select one or more of the provided listings to the client as recommended for reservation based, at least in part, on an optimization goal for the client.

7. The method of claim 5, wherein all of the listings are modified listings for the identified one or more reserved compute instances.

8. The method of claim 5, wherein providing access comprises sending an administrator login and password to the computing device of the client.

9. The method of claim 5, wherein said reconfiguring the at least one of the identified one or more reserved compute instances in order to satisfy the specified instance configuration is performed without authorization from a corresponding current owner of the identified one or more reserved compute instances.

10. The method of claim 5, wherein said reconfiguring the at least one of the identified one or more reserved compute instances in order to satisfy the specified instance configuration comprises performing at least one of:
a modification operation to reconfigure the at least one reserved instance without incurring an additional resource cost to the virtual computing resource provider;
an upgrade operation to reconfigure the at least one reserved instance that incurs an additional resource cost to the virtual computing resource provider; or
a downgrade operation to reconfigure the at least one reserved instance that incurs a residual resource value for the virtual computing resource provider.

11. The method of claim 5, wherein the requested modified listing for the at least one identified reserved compute instance describes a configuration with:
a reservation term length less than a reservation term length in an original listing for the at least one identified reserved compute instance submitted by a corresponding current owner of the at least one identified reserved compute instance; or
a computational resource amount less than an original computational resource amount in the original listing for the at least one identified reserved compute instance submitted by the corresponding current owner of the at least one identified reserved compute instance.

12. The method of claim 5, wherein said reconfiguring the at least one of the identified one or more reserved compute instances in order to satisfy the specified instance configuration comprises combining two or more of the identified reserved compute instances in order to satisfy the specified instance configuration.

13. The method of claim 5, wherein the client is distinct from the corresponding current owner of the at least one identified reserved compute instance.

14. A non-transitory, computer-readable storage medium, storing program instructions that when executed by a plurality of computing devices cause the plurality of computing devices to implement:
reserving at least one compute instance for each of a plurality of current owners for a specified length of time;
receiving a request, at a virtual computing resource provider, for respective listings of different ones of a plurality of reserved compute instances that satisfy a specified instance configuration from a computing device of a client, wherein each of the different ones of the plurality of reserved compute instances are reserved to a corresponding current owner of the plurality current owners for specified lengths of time;

based, at least in part, on respective current configurations for each of the plurality of reserved compute instances, identifying one or more reserved compute instances that are reconfigurable to satisfy the specified instance configuration;

providing the listings for the different ones of the plurality of reserved compute instances including one or more modified listings for the identified one or more reserved compute instances that are reconfigurable to satisfy the specified instance configuration for reservation by the computing device of the client, wherein the one or more modified listings each describe a configuration that satisfies the specified instance configuration receiving, from the computing device of the client, a reservation request for one of the one or more modified listings;

in response to receiving the reservation request from the computing device of the client:
  reconfiguring at least one of the identified one or more reserved compute instances in order to satisfy the specified instance configuration as described in the requested modified listing; and
  providing access to the reconfigured at least one reserved compute instance to the computing device of the client.

15. The non-transitory, computer-readable storage medium of claim 14, wherein the program instructions further cause the plurality of computing devices to implement receiving a request to list a particular identified reserved compute instance of the identified one or more reserved compute instances, wherein the request includes authorization to reconfigure the particular identified reserved compute instance.

16. The non-transitory, computer-readable storage medium of claim 14, wherein said receiving the request for respective listings, said identifying the one or more reserved compute instances, and said providing the listings are performed by another reserved compute instance with the specified instance configuration.

17. The non-transitory, computer-readable storage medium of claim 14, wherein, in said reconfiguring the at least one of the identified one or more reserved compute instances in order to satisfy the specified instance configuration as described in the requested modified listing, the program instructions further cause the plurality of computing devices to implement performing one or more of:
  a modification operation to reconfigure the at least one reserved instance without incurring an additional resource cost to the virtual computing resource provider;
  an upgrade operation to reconfigure the at least one reserved instance that incurs an additional resource cost to the virtual computing resource provider; or
  a downgrade operation to reconfigure the at least one reserved instance that incurs a residual resource value for the virtual computing resource provider.

18. The non-transitory, computer-readable storage medium of claim 14, wherein the client is distinct from the plurality of current owners.

* * * * *